Figure 6:
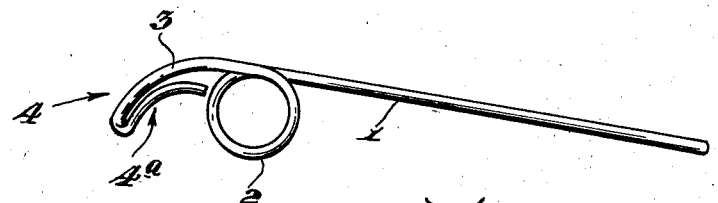

Feb. 13, 1940. J. O. SIMMONS, SR 2,190,166
ATTACHMENT FOR CULTIVATORS
Filed March 7, 1938 2 Sheets-Sheet 1
Fig. 1.
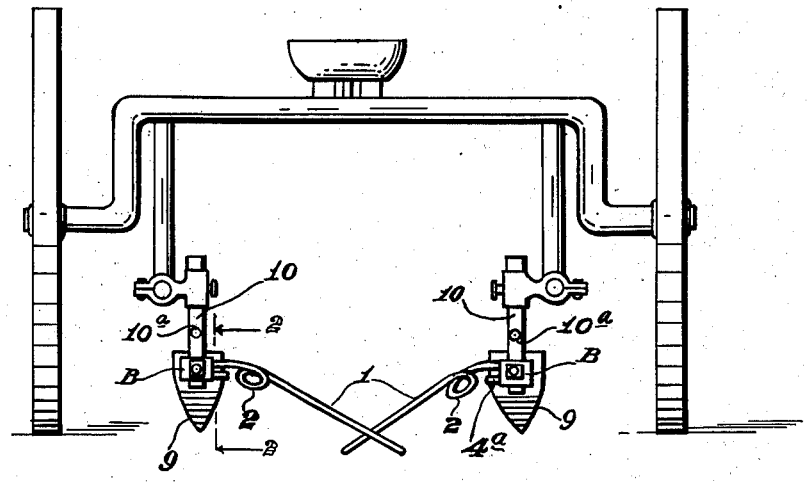
Fig. 2.
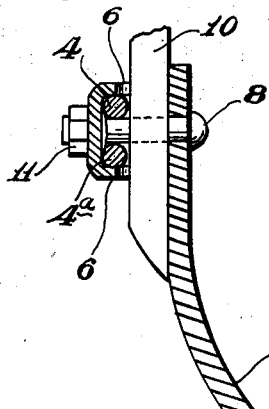
Fig. 3.
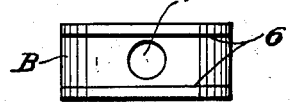
Fig. 4
Fig. 5.
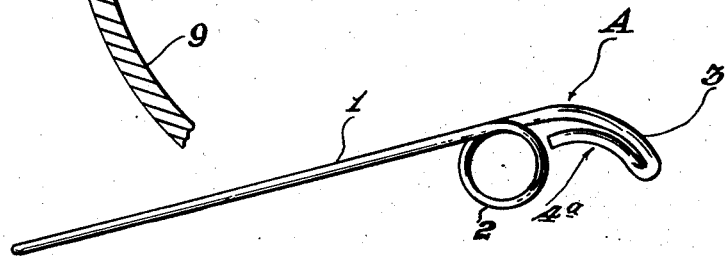
James O. Simmons, Sr.
INVENTOR.
BY John M. Spellman
ATTORNEY.

Feb. 13, 1940. J. O. SIMMONS, SR 2,190,166
ATTACHMENT FOR CULTIVATORS
Filed March 7, 1938 2 Sheets-Sheet 2

James O. Simmons, Sr.
INVENTOR.
BY John M. Spellman
ATTORNEY.

Patented Feb. 13, 1940

2,190,166

UNITED STATES PATENT OFFICE 2,190,166

ATTACHMENT FOR CULTIVATORS

James O. Simmons, Sr., Troy, Tex.

Application March 7, 1938, Serial No. 194,419

1 Claim. (Cl. 97—193)

This invention relates to cultivator attachments, particularly for the cutting of grass and weeds from growing cotton and other plants, and is an improvement over Letters Patent of the United States No. 1,682,182, issued August 28, 1928.

The invention is especially designed as an attachment for standard cultivators and planters, the object being to provide a simple device of this nature for the cutting of weeds and grass by severing such vegetation at the roots without injury to the growing plants.

The present invention which embodies the improvement seeks to provide a more efficacious manner of attaching the device to a cultivator shank which carries the sweeps or shovels, such arrangement providing a more secure and efficient means for fastening the attachment in operative position.

Figure 7:
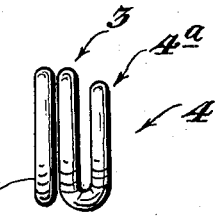
Figure 8:
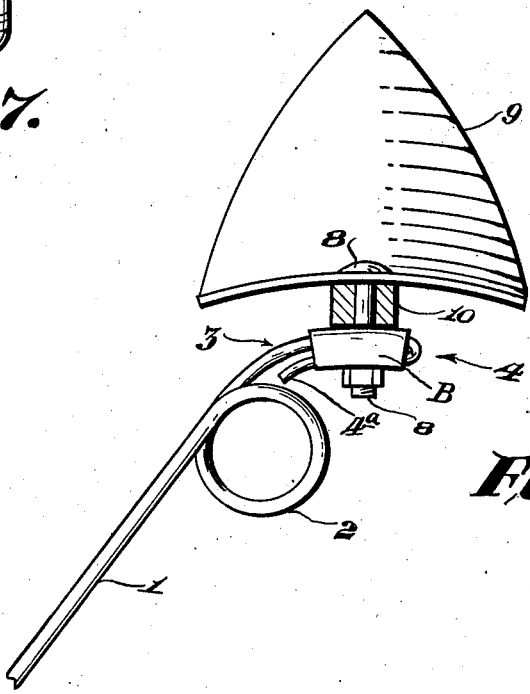

The new and improved attachment will be readily understood from a perusal of the following detailed description, taken in connection with the accompanying drawings, and in the drawings:

Figure 1 represents a rear elevational view of a cultivator, illustrating the improved weed and grass cutter attachment in operative position thereupon, Figure 2 is an enlarged detail sectional view of the attachment, the shovel partly broken away, the view being taken along the line 2—2 of Figure 1, Figure 3 is a side elevational view of a clamping member used in holding the attachment in position, Figure 4 being a plan view of Figure 3, Figures 5 and 6 are side elevational views, respectively, of the attachment rod, per se, showing the open loop formation as adapted to right and left positions on a cultivator shank and shovel, Figure 7 is an elevational view of the open looped end of one of the attachment rods, and Figure 8 is a plan view of a cultivator shovel, showing one of the attachment rods in operative position on the shank thereof, the latter being shown in cross section, with the rod partly broken away.

In carrying out the invention, a steel rod 1 of specially treated and tempered steel of approximately one fourth of an inch in diameter and about ten inches in length is coiled near one end of the rod to form a circular loop 2. The shorter portion of the rod beyond the loop 2 and as indicated at 3 is curved slightly so that when in position on the shovel and shank, the longer portion of the rod 1 will trail in an oblique position slightly to the rear of the shovel or shovels 9, as shown in Figures 1 and 8. The shorter portion of the attachment is then formed into an open loop as at 4. The rod 1 as formed with the circular and open loops is made for right and left positions, that is one rod each is placed on cultivator shanks on opposite sides of a plant row, in the manner shown in Figure 1. The soil engaging ends of the rods are then in a cross position one over the other.

Since the shanks 10 of cultivators and planters are generally a slight forwardly inclined position, the open loop formation 4 of the attachment herein described is so formed that its free end as at 4—a is on an arc of a different circle than the curved portion 3. This construction permits the open loop 4 to follow the angular position of the shank referred to above. Figure 5 shows one of the rods as formed for a right side position of a cultivator shank according to the position of the shanks in Figure 1. Figure 6 shows one of the rods formed for a left side position on the shank on the opposite side of a row of plants. The free end 4—a of the open loop is accordingly bent or curved in a position to fit both cultivator shanks, one free end 4—a of one loop being in a position the reverse of the other free end of the loop on the opposite shank.

The loop 4 is adapted to be received in a clamp member B, such as shown in Figures 3 and 4. This member consists of a piece of curved metal having its sides as at 6 bent upwardly to provide a channel and in this channel is placed the looped portion 4 of the attachment or rod. A hole 7 is formed in the body of the clamp member and a bolt and nut 8 and 11, respectively, hold the rod in position. The extremities of the longer portions of the rods 1 are submerged in the soil, the rods taking an oblique position with respect to the ground and the shanks and shovels. As the cultivator or instrument carrying the attachment is drawn through a field the stalks of the plants push the rods apart as they come in contact therewith so that the rods drag by the plants on both sides and all undesirable vegetation is removed. The pressure brought on the loop portion 2 of the rods provides sufficient force to cut the vegetation, yet is resilient enough to permit the plants to pass between the rods without injury to the former.

In affixing the attachment to the shovels or sweeps 9, the loop 4 is placed in the clamp member B, shown in Figures 3 and 4, the clamp member is then placed with its upturned edges 6 against the shank 10, a bolt 8 is then placed through the shovel and shank, 9 and 10, respectively, the bolt passing between the curved portions of the open loop member 4 and finally through the clamp member. A nut 11 is then advanced on the bolt to hold the attachment in position.

Attention is directed to the fact that the rod 1 extends beyond the circular loop 2 on a line directly on a plane with the longer portion of the rod up to a point indicated at A and from this point the rod is curved as at 3, including the free end 4—a so that the open loop portion is curved on itself slightly so as to fit the similarly curved clamp member.

In some types of cultivators or planters it may be necessary to affix the rod or rods 1 thereto by the loop 4 and at a higher opening as at the hole 10—a in the shank 10, in order to avoid interference of the circular loop 2 with the shovels 9, which might be of such shape as to prevent proper resilient effect of the rod or rods 1.

The foregoing description discloses in connection with the drawings a simple, practical and more convenient means for securing the attachment directly to the shovel and shank of a cultivator and securely holds the device in operative position. The attachment may, however, be modified to some extent in keeping with the spirit of the invention and still remain within the meaning and scope of the claim appended hereto.

What is claimed as new is:

A weeder attachment for a cultivator having a shank and shovel comprising in combination, a resilient rod adapted to be secured to the shank of the cultivator so as to extend laterally and rearwardly therefrom, said rod having one end portion curved to form an open loop, one portion of the loop being in the arc of one circle and the free end of the loop being formed in the arc of a different circle, said rod having a body portion adapted to be submerged at one end into the soil, a closed loop formed within said rod intermediate the open loop and the opposite extremity of said rod, a clamp member longitudinally arched and having flanges on its long edges forming a curved chamber to receive the open loop of the rod, securing means for holding the open looped end of the rod in adjusted position in the clamp on the shank of the cultivator, and the curved chamber being of sufficient size so that the looped end of the rod is retained therein in resilient adjustment.

JAMES O. SIMMONS, Sr.